Patented Feb. 25, 1936

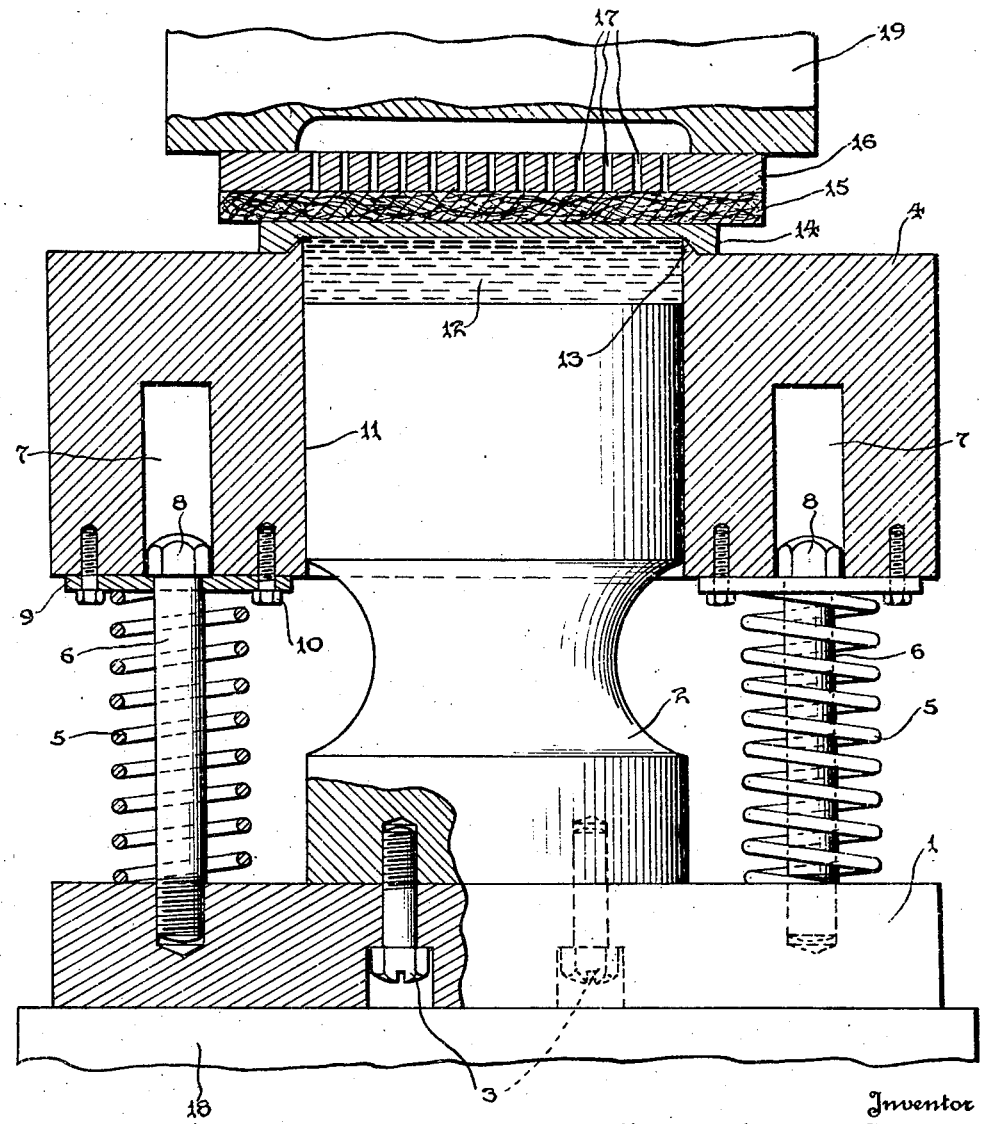

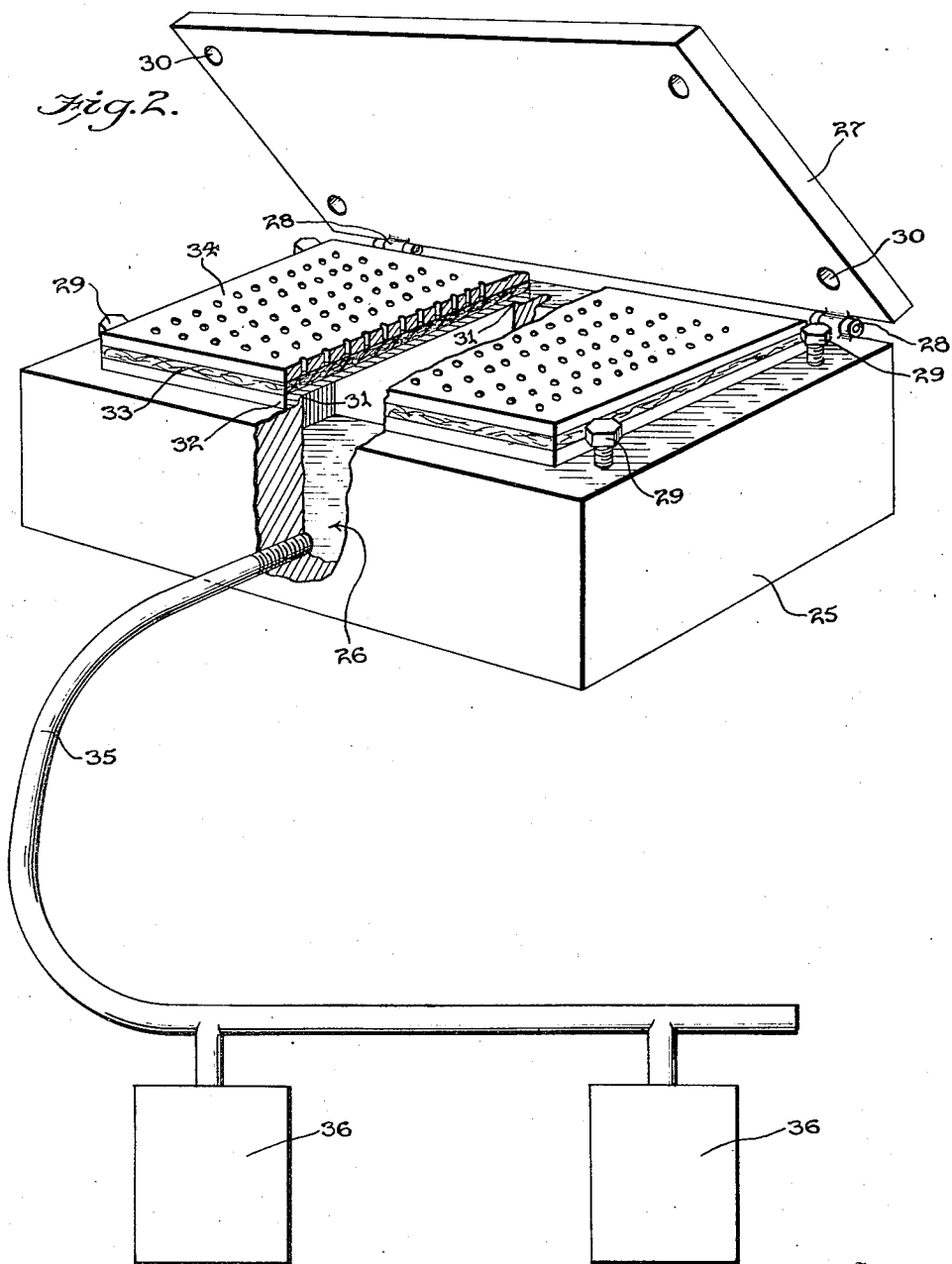

2,032,027

UNITED STATES PATENT OFFICE 2,032,027

METHOD AND APPARATUS FOR IMPREGNATING LEATHER

Louis du Bois Rees, New York, N. Y., assignor to Hans Rees' Sons, Inc., New York, N. Y.

Application May 25, 1931, Serial No. 539,888

10 Claims. (Cl. 91—68)

This invention relates to leather impregnation and more particularly to a novel method and apparatus for impregnating sheet leather with rubber or the like.

The primary purpose of the invention is to provide a method and apparatus for the impregnation of leather, and/or cured and prepared skins, with rubber and/or rubber compounds, and/or synthetic rubber, and the system is such that the rubber or the like may be forced entirely through the sheet to be impregnated, or only partially through the same.

By impregnation is meant the filling in of the pores of the hide or skin and the coating of the fibers of the same with an impregnating material having the characteristics of rubber.

Leather impregnated in accordance with the invention is especially suitable for shoe soles, power transmission belts or the like, due to the fact that the rubber adds elasticity, durability and tensile strength and forms a non-skid surface which tends to adhere to the pulleys, thus preventing slipping of the belt and loss of power. It also makes the leather water proof and acid resisting.

With the foregoing objects outlined and with other objects in view which will appear as the description proceeds, the invention consists in the novel features hereinafter described in detail, illustrated in the acompanying drawings, and more particularly pointed out in the appended claims.

In the drawings,

Fig. 1 is a diametrical vertical sectional view partly in elevation of one form of an apparatus which I have devised for my purpose.

Fig. 2 is a perspective view partly broken away, of another form of the apparatus.

In the embodiment of my invention illustrated in Fig. 1, I designates a base plate to which a stationary piston 2 is fixed by any suitable means such as screws 3.

A cylinder 4 is adapted to reciprocate on the piston, and this cylinder is normally yieldingly held in elevated position by coil springs 5 which surround guide bolts 6 that are rigidly connected with and extend upwardly from the base. Pockets 7 in the cylinder permit the latter to reciprocate without interference by the heads 8 of the bolts, and to prevent the springs from forcing the cylinder up to too great an extent, guide plates 9 are secured to the cylinder by any suitable means, such as screws 10, and abut against the bolt heads when the cylinder is in its uppermost position.

When the cylinder is in this position, the portion of the bore 11 above the top of the piston forms a basin for the reception of the impregnating material 12. This may be any suitable fluid having the characteristics of rubber. For instance, it might be plastic rubber, plastic latex, plastic rubber compounds or plastic synthetic rubber. In other words, it is a rubbery compound in such condition as to flow into the leather when pressure is exerted on such compound.

It will be noted that an annular lip 13 surrounds the upper end of the bore 11 and is preferably tapered to form a relatively sharp edge. When the parts are in the position shown in Fig. 1, a sheet 14 of leather or skin, to be impregnated, is placed across the top of the bore and in contact with the edge of the lip 13, with the grain side of the sheet downward. Then, a pad 15 of felt or the like may be superposed on the leather sheet, and afterwards, a metal plate 16 having suitable perforations 17 therein, is superposed on the felt pad. The parts 14, 15 and 16 are of such dimensions as to extend entirely over the bore 11, but in some instances it is unnecessary to use the pad 15.

Now the assembly may be placed in any suitable press. For example, the base 1 may be placed on the stationary anvil 18 of a press, and the plunger 19 of the latter may be brought downwardly on to the perforated plate 16. Then, as the plunger is moved toward the anvil, the cylinder 4 will move downwardly and as the depth of the basin is thereby diminished, the impregnating plastic 12 is forced into the pores of the sheet 14. The degree of penetration will depend upon the pressure exerted. It is preferred that the impregnating plastic be forced almost entirely, but not quite through the sheet 14, but if desired, it can be forced all the way through. During such operation, the air will be forced from the pores of the sheet into the pad 15 and into the perforations 17, and as the parts 15 and 16 are flat, there is no liability of the force being exerted to too great extent locally at any one point and rupturing the sheet 14.

After the sheet has been impregnated to the desired degree, the plunger 19 is raised and then the springs 5 act to return the cylinder 4 to its uppermost position. Now, the parts 16 and 15 can be removed, and then the sheet 14 can be detached and the operation can be repeated on another sheet.

It will be apparent that as the members 18 and 19 move toward one another or one moves toward the other, the springs 5 in coming under compression, cause a greater force to be exerted on the cylinder 4, which in turn causes the annular lip 13 to penetrate deeper into the sheet 14, thereby creating a seal to prevent leakage as the pressure on the fluid 12 is increased, due to the action of the piston 2.

Instead of using an apparatus involving a relatively movable cylinder and piston, I may employ a different form of apparatus which I have devised and which is illustrated in Fig. 2. In this embodiment, a box body 25 having a relatively thick bottom and thick walls forms a stationary basin 26 to receive the impregnating fluid. A lid 27 is hinged at 28 to the top of the box and is adapted to be securely fastened down by any suitable means such as bolts 29 which pass through holes 30 in the top. As the body and lid are formed of relatively thick metal portions, it will be understood that they are capable of withstanding extremely high pressures. The mouth of the basin 26 of this box is surrounded by a rectangular upwardly extending tapered lip 31 over which the sheet 32 of leather or the like is arranged. Here also a pad 33 of felt or the like may or may not be placed on top of the sheet to be impregnated, and then a perforated plate 34 is superposed on the pad. Afterwards, the lid is closed so as to firmly clamp the sheet 32 between the lip 31 and the pad 33, if the latter is employed.

Now, the impregnating fluid may be introduced into the basin 26 under pressure created in any suitable way. For example, the impregnating fluid may be forced under relatively high pressure through a pipe 35 which receives the fluid from compressor 36 and discharges the same into the basin 26.

The impregnating fluid forced in in this way will penetrate the sheet 32, and this will cause the air discharged from the pores of the sheet 32 to pass through the felt pad into the apertures of the plate 34, or directly into the apertures of the plate if the felt pad is not employed.

While the method and apparatus are especially suitable for the impregnation of leather with rubber compounds, it will be appreciated that they may be used for the impregnation of material other than leather or skins, with other impregnating substances.

From the foregoing it is believed that the construction, operation and advantages of the invention may be readily understood by those skilled in the art, and it is manifest that changes may be made in the details disclosed, without departing from the spirit of the invention, as expressed in the claims.

What is claimed and desired to be secured by Letters Patent is:—

1. A method of impregnating a sheet of leather or skin with an impregnating fluid, comprising confining the fluid in a basin, arranging the sheet to be impregnated across the top of the basin, exerting pressure upon the fluid in the basin to cause the same to move upwardly and penetrate the pores of the sheet, and simultaneously exerting pressure on the sheet in the opposite direction.

2. A method of impregnating a sheet of leather or skin with a plastic rubber compound, comprising confining the compound in a basin, arranging the sheet to be impregnated across the top of the basin, then exerting pressure upon the compound in the basin, to cause the same to move upwardly and penetrate the pores of the sheet, and holding the sheet taut while permitting air to discharge upwardly from the same during such impregnation.

3. A method of impregnating a sheet of leather or skin with a plastic rubber compound, comprising confining a mass of plastic rubber compound in a basin, arranging the sheet to be impregnated across the mouth of the basin, and then moving a wall of the basin relatively to the bottom thereof for compressing the compound and causing the same to penetrate the pores of the sheet.

4. A method of impregnating a sheet of leather or skin with a plastic rubber compound, comprising confining a mass of plastic rubber compound in a basin, arranging the sheet to be impregnated across the mouth of the basin, and then moving a wall of the basin relatively to the bottom thereof for compressing the compound and causing the same to penetrate the pores of the sheet while exerting pressure at all points on the sheet on the side opposite that facing the basin.

5. A method of impregnating a sheet of leather or skin with an impregnating fluid rubber compound, comprising confining the compound in a basin, placing the sheet to be impregnated across the top of the basin, then exerting pressure upon the compound in the basin to cause the same to move upwardly and penetrate the pores of the sheet, and preventing the sheet from rising during such penetration.

6. A method of impregnating a sheet of porous material with an impregnating fluid, comprising confining the fluid in a basin, arranging the sheet to be impregnated across the top of the basin, then exerting pressure upon the fluid in the basin to cause the same to move upwardly and penetrate the pores of the sheet, and holding the sheet taut during such penetration.

7. A method of impregnating a sheet of fibrous material with an impregnating fluid, comprising confining the fluid in a basin, arranging the sheet to be impregnated across the top of the basin, then exerting pressure upon the fluid in the basin to cause the same to move upwardly and penetrate the fibers of the sheet, and holding the sheet taut during such penetration.

8. The method of impregnating a material with a substance contained in a liquid which consists in supporting the material by a screened surface to prevent the material from being forced through the screen while permitting air and liquid to pass through the screen, and in forcing liquid containing an impregnating substance through the material at high pressure to deposit the substance upon and within the fibers of the material to be impregnated.

9. The method of impregnating a material with a substance contained in a liquid which consists in supporting the material by a screened surface to prevent the material from being forced through the screen, while permitting air and liquid to pass through the screen and in forcing liquid containing an impregnating substance through the material at high pressure to deposit the substance upon and within the fibres of the material to be impregnated, while sealing the liquid against leakage above the screen by sealing engagement with the material to be impregnated.

10. The method of impregnating sheet material which consists in porously supporting the sheet material upon one side, in sealing against the other side about the area to be impregnated and in forcing liquid containing impregnating material against the side sealed, under high pressure to pass the liquid bodily through the sheet material.

LOUIS DU BOIS REES.